Dec. 22, 1936. J. EGGERT ET AL 2,064,892
PRINTING LENTICULAR FILM
Filed Feb. 27, 1934 2 Sheets-Sheet 1
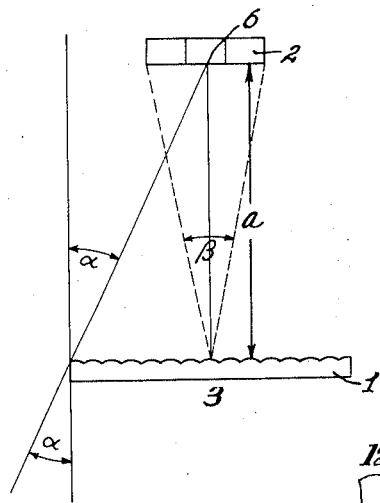
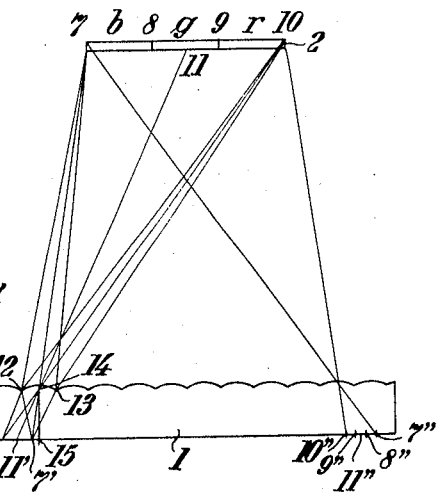
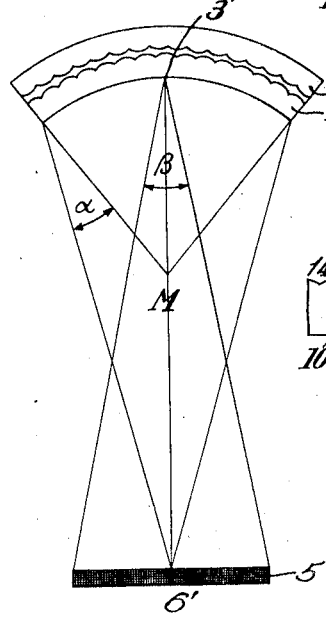
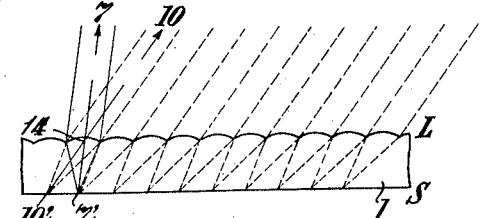
Inventors:
John Eggert,
Gerd Heymer,
By Attorneys
Potter, Pierce & Scheffler Dec. 22, 1936.  J. EGGERT ET AL  2,064,892
PRINTING LENTICULAR FILM
Filed Feb. 27, 1934   2 Sheets-Sheet 2
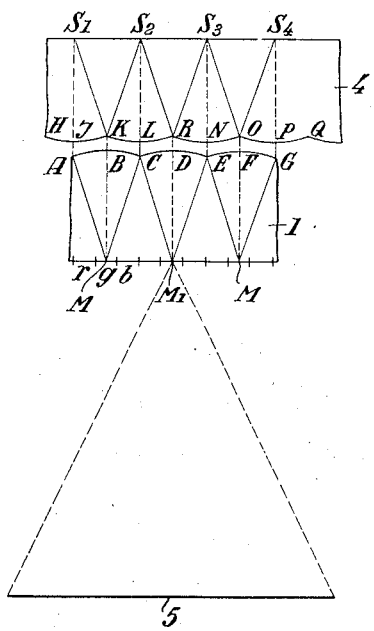
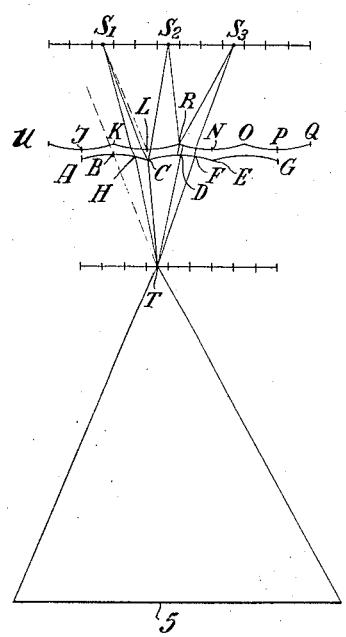
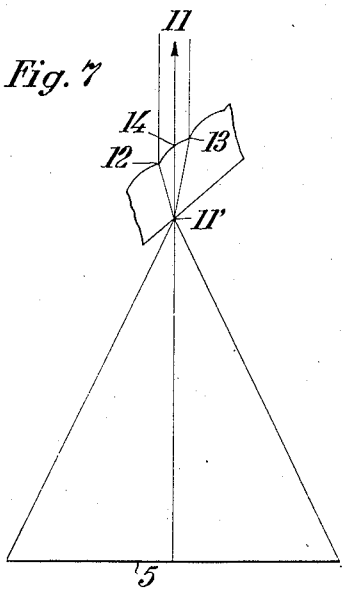
Inventors:
John Eggert,
Gerd Heymer,
By Attorneys
Potter, Pierce & Scheffler Patented Dec. 22, 1936

2,064,892

UNITED STATES PATENT OFFICE 2,064,892

PRINTING LENTICULAR FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application February 27, 1934, Serial No. 713,187
In Germany February 28, 1933

2 Claims. (Cl. 95—75)

Our present invention relates to printing lenticular film and more particularly to contact printing lenticular film.

One of its objects is to provide a process of contact printing lenticular film. Further objects will be seen from the detailed specification following hereafter. Reference is made to the accompanying drawings in which Fig. 1 shows the arrangement of lenticular film and multi-color filter in taking, Fig. 2 shows the arrangement for printing according to this invention, Fig. 3 shows the optical condition during exposure, Fig. 4 shows the incidence of the light on the marginal part of the film on an enlarged scale, Fig. 5 shows printing the middle of the green filter strip on the middle of the picture field, Fig. 6 shows printing of another color than green on the middle of the picture field, and Fig. 7 shows the incidence of the light rays on the marginal part of a bent film.

In printing by contact a lenticular film on to another lenticular film, the contact being between the embossed sides of the films, care must be taken that a pencil of light projected on the picture field of the original is projected on the marginal portion thereof at another angle than on the central portion. For this purpose it has already been proposed to use a source of light in co-operation with a slot-like diaphragm and to move this aggregate over the whole picture field in printing.

According to the present invention which avoids moving of the source of light, the original and the film to be printed on are arranged with their embossed sides in contact, bent to a cylindrical plane, and exposed from the side of the original. The radius of curvature of the cylindrical plane is determined by the condition that the lines joining the borders of the films with the center of the source of light, form with the perpendiculars to the tangents to the place at the borders of the films the same angle as the lines joining the center of the exposure filter or its virtual image with the perpendiculars erected on the borders of the film. The extension of the source of light in the direction of the lenticular elements should be as small as possible, whereas the extension of the source of light in the direction perpendicular to the lenticular elements must be such that the source of light subtends the same angle at the center of the film as the filter or its virtual image subtended at the center of the original when that was being exposed.

The process will now be described with reference to the accompanying drawings.

Fig. 1 shows the arrangement and relations of the film and filter during the taking of the original film. 1 is the lenticular film and 2 is the exposure filter arranged at the distance $a$ from the film 1. From the picture middle 3 the filter appears under the angle $\beta$. The lines drawn from the filter middle 6 towards the borders of the picture field 1 and the perpendiculars erected on the borders of the pictures form the angle $\alpha$.

Fig. 2 shows the arrangement and relations of the original film, the printing film and the source of light in printing. 1 is the original film which together with the printing film 4 is curved to form a cylindrical surface. On the concave side of the cylindrical surface is arranged the source of light 5 at any required distance from the film, but in such a breadth that at the picture middle 3' it subtends the angle $\beta$ equal to the angle subtended, during the exposure, by the exposure filter at the picture middle 3. The curvature of the film is such that the lines joining the picture borders with the center 6' of the source of light 5 together with the perpendiculars erected on the tangents of the picture borders form the angle $\alpha$ which must be equal to the angle $\alpha$ of Fig. 1 if an original exposed under the conditions shown in Fig. 1 is being printed. M is the center of curvature.

Fig. 3 shows the optical conditions during exposure of the original film, as they have been shown in Fig. 1, however the lenticular film has been drawn on an enlarged scale. 2 is the image of the filter when viewed from the film. 9—10=$r$ is the red filter strip, 8—9=$g$ is the green filter strip, 11 is the middle of the green filter strip which is simultaneously the middle of the whole filter, and 7—8=$b$ is the blue filter strip. The trace of the rays has been shown for the lenticular element 12—13 on the marginal part of the original film 1. The trace of the rays is characterized by the bordering rays 10—12—10' and 10—13—10' and the axial ray 10—14—10'. The projection of point 10 by the lenticular element 12—13 is, therefore, found as usual by producing the line 10—14 until it cuts the picture layer, whereby a light deviation of the rays which is owing to the fact that the lenticular elements are in touch with the air only on one side, has been disregarded for the sake of clarity. In an analogous manner projection of the point 7 at 7' will be found by tracing the rays 7—12—7', 7—14—7', 7—13—7'. Attention is called to the fact that on the marginal parts of the film the projection of the filter has been displaced behind each lenticular element towards the margin with relation to the axis 14—15. Thus, in the margin opposite to that just considered, projection of the points 7 and 10 at 7" and 10" is displaced towards the margin.

In Fig. 3 the mutual dimensions of filter and film are not those corresponding with the actual relations, because for the sake of clarity the lenticular elements have been drawn on too great a scale in comparison with the filter and its distance, and the breadth of the film. Therefore, the pencil of rays limited by the rays 10—12 and 10—13 appears to be convergent. In reality these rays are practically parallel in view of the small dimensions of the lenticular elements (about 0.03 mm. when the apparent distance of the filter is, for instance, 40 mm.). These relations are more correctly represented in Fig. 4; all the rays striking the lenticular elements and emanating from the same point 10 of the filter are parallel so that the axis 10—14 and their production against 10 is characteristical for the color of these rays. Analogously the rays parallel to the axis 7'—14 are characteristical for the color of 7.

In Fig. 5 there is shown the process of printing the middle of the green filter strips on the middle of the picture field. AC, CE and EG are three lenticular elements of the original. r g b are the areas which correspond with the red, the green and the blue filter strip of the exposure filter. M, $M_1$, $M_2$ are the middles of the projections of the green filter strips confederate with each lenticular element of the original film. 5 is a thread-like source of light which is shown in a position nearer to the film than in reality, but which emits a pencil of light with relation to point $M_1$ under the correct angular conditions. These rays diverge from $M_1$ and just fill the lenticular element CE when reaching the latter. The direction of these rays emanating in parallel condition is given by the axis $M_1D$. The same holds true with regard to the trace of rays for the lenticular elements AC and EG so that parallel rays emanate from the whole front of the film. Therefore, if all lenticular elements are well formed, it is not possible to detect from which lenticular element a single ray emanates. It is only possible to determine the direction which, as shown above, is decisive for the color of the confederate picture point. Therefore, it does not matter, which is the position of the lenticular elements of the printing film with regard to those of the original film, whether they face exactly the lenticular elements of the original or whether they are displaced with regard to them, as in exposure of the original parallel rays strike the print which are exactly united under the middle of the lenticular elements since they strike the printing film exactly perpendicularly, that is to say $S_1$, $S_2$, $S_3$, $S_4$ are images of the points M, $M_1$, $M_2$. Attention is drawn to the fact that with the relative position of the lenticular elements of the original and the print as shown in Fig. 5 for instance, the point $M_1$ has not one image on the print but two, namely $S_2$ and $S_3$. These images lie on exactly corresponding places under the lenticular elements and, therefore, yield in projection the same color.

In Fig. 6, it has been shown for the same place of the picture field, that is to say, for the middle, how another color is printed. The middle of the red strips has been chosen for this purpose. On consideration of the figure it will be seen that the pencil of light emanating from red strips is only partially projected on the lenticular element CE, namely on the part CF. The remaining portion falls on the part HC of the lenticular element AC, which lies adjacent the lenticular element CE. The further course of the rays must be considered separately for these two portions. As in Fig. 4 the rays of the pencil of light emanating from the lenticular element CE are parallel with the axial ray TD. Similar considerations are applicable for the other lenticular elements so that parallel pencils of rays emanate from the lenticular elements of the original. Their direction corresponds with that of TD and is inclined towards the axis of the lenticular elements. Between these pencils there are gaps at a certain distance from the lenticular elements of the original which gaps correspond with those portions of the pencils that are projected on the adjacent lenticular elements. Like Fig. 5 the pencil of light projected on the lenticular elements of the printing film is directed to those places of the emulsion layer which correspond with the direction of incidence of the pencils. Inasmuch as this direction is the same for the printing film as for the original the point T must be copied in points $S_2$ and $S_3$. The pencil of rays projected on the lenticular element AC from T emanates from this lenticular element parallel with the axis TB. Similar considerations are applicable to the pencils of rays emanating from the remaining lenticular elements. The pencil is projected on KR and is copied at the place where the parallel to the axis TB through the middle L of this lenticular element meets the emulsion layer in $S_1$. $S_1$ corresponds as to position with relation to UK with that of T with relation to CE, that is to say T is reproduced in the correct color.

In the described instance the pencil of light which serves for illumination of the original has partly followed another way than the pencil of light in exposing the original. In view of the oblique incidence of the light rays on the copying lenses there may occur distortions whereby the rendition of the colors is deteriorated and, therefore, it is advisable to restrict the oblique incidence to as small a part as possible. This is most important for the lenticular elements positioned at the margins of the film. As already described above with reference to Fig. 3 the middle of the green filter strip is projected so that the incidence is oblique whereas the incidence of the other colors is less but still substantially oblique. Now, in order that the rays of the source of light be projected under the same angle on the margins of the film as on the middle part it would be necessary to displace the source of light towards the margins of the film.

In order to avoid displacement of the source of light the film is bent to such an extent that the rays of the source of light proceed in the direction of the rays from the middle of the green filter strip on the margins of the film in exposure. In Fig. 7 the numbers correspond with those of Fig. 3, however in this Figure 7 the film has been bent, so that the source of light projects the rays on the film in the same direction as in exposing the original. The geometrical rules for fulfilling this condition have been described.

The printing process according to this invention has of course no influence on the position and size of the projection filter with relation to the projected print. These relations correspond with those obtained during exposure of the original film.

What we claim is:

1. A process of printing lenticular film which comprises arranging an original and a printing film in contact with the embossed sides facing each other, arranging a source of light with small extension in the direction parallel to the lenticular elements in front of the original so that it is seen from the center of the original under the same angle as was seen the multi-color filter in taking, and bending the two films to a cylindrical plane so that the angle between the perpendiculars erected on the tangents in the borders of the film and the lines from the border of the film to the center of the source of light form the same angle as these lines form in taking.

2. In an apparatus for printing lenticular film in combination, an original and a printing film in contact, a source of light in front of said original having a small extension in the direction parallel to the lenticular elements and in the direction perpendicular to the lenticular elements an extension that it is seen under the same angle as was seen the multi-color filter in taking, said films forming a cylindrical plane so that the angle between the perpendiculars erected on the tangents in the borders of the film and the lines from the borders of the films to the center of the source of light form the same angle as these lines form in taking.

JOHN EGGERT.
GERD HEYMER.